United States Patent
Xu et al.

(10) Patent No.: US 9,085,968 B2
(45) Date of Patent: Jul. 21, 2015

(54) EXPANDABLE TUBULAR AND METHOD OF MAKING SAME

(71) Applicants: YingQing Xu, Tomball, TX (US); Zhiyue Xu, Cypress, TX (US)

(72) Inventors: YingQing Xu, Tomball, TX (US); Zhiyue Xu, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 449 days.

(21) Appl. No.: 13/706,590

(22) Filed: Dec. 6, 2012

(65) Prior Publication Data

US 2014/0158378 A1 Jun. 12, 2014

(51) Int. Cl.
*E21B 43/10* (2006.01)
*B21C 23/00* (2006.01)
*E21B 29/00* (2006.01)

(52) U.S. Cl.
CPC .............. *E21B 43/108* (2013.01); *E21B 29/00* (2013.01); *E21B 43/103* (2013.01); *B21C 23/00* (2013.01)

(58) Field of Classification Search
CPC ... E21B 43/103; E21B 43/105; E21B 43/106; E21B 43/108; B21C 23/00–23/32
USPC .................... 166/231, 235, 230, 229; 72/393; 264/177.14
See application file for complete search history.

(56) References Cited

U.S. PATENT DOCUMENTS

| | | | |
|---|---|---|---|
| 2,189,697 A | 2/1940 | Baker | |
| 2,222,233 A | 11/1940 | Mize | |
| 2,225,143 A | 12/1940 | Baker et al. | |
| 2,672,199 A | 3/1948 | McKenna | |
| 2,753,941 A | 7/1956 | Hebard et al. | |
| 2,933,136 A | 4/1960 | Ayers et al. | |
| 3,142,338 A | 7/1964 | Brown | |
| 3,602,305 A | 8/1971 | Kisling | |
| 4,284,137 A | 8/1981 | Taylor | |
| 4,524,825 A | 6/1985 | Fore | |
| 4,719,971 A | 1/1988 | Owens | |
| 4,784,226 A | 11/1988 | Wyatt | |
| 4,901,794 A | 2/1990 | Baugh et al. | |
| 5,511,620 A | 4/1996 | Baugh et al. | |
| 6,354,372 B1 | 3/2002 | Carisella et al. | |
| 6,394,180 B1 | 5/2002 | Berscheidt et al. | |
| 6,446,717 B1 | 9/2002 | White et al. | |
| 6,513,600 B2 | 2/2003 | Ross | |
| 6,712,153 B2 | 3/2004 | Turley et al. | |

(Continued)

OTHER PUBLICATIONS

Garry Garfield, "Formation Damage Control Utilizing Composite-Bridge-Plug Technology for Monobore, Multizone Stimulation Operations," SPE 70004, Copyright 2001, Society of Petroleum Engineers Inc., This paper was prepared for presentation at the SPE Per.

(Continued)

*Primary Examiner* — Blake Michener
(74) *Attorney, Agent, or Firm* — Cantor Colburn LLP

(57) ABSTRACT

A radially expandable device including a tubular body formed from an extruded member having an extrusion direction. The extruded member is configured after extrusion of the extruded member so that the extrusion direction aligns with a resulting circumference of the tubular body during formation of the tubular body from the extruded member. The extruded member is formed from a material operatively arranged to disintegrate upon exposure to a selected borehole fluid. The tubular body is operatively arranged to be expanded from a first radial dimension to a second radial dimension. Methods of making and using a radially expandable device are also included.

15 Claims, 2 Drawing Sheets

(56) References Cited

U.S. PATENT DOCUMENTS

| | | | |
|---|---|---|---|
| 6,712,797 B1 | 3/2004 | Southern, Jr. | |
| 6,769,491 B2 | 8/2004 | Zimmerman et al. | |
| 7,128,145 B2 | 10/2006 | Mickey | |
| 7,165,622 B2 | 1/2007 | Hirth et al. | |
| 7,168,494 B2 | 1/2007 | Starr et al. | |
| 7,210,533 B2 | 5/2007 | Starr et al. | |
| 7,350,582 B2 | 4/2008 | McKeachnie et al. | |
| 7,607,476 B2 | 10/2009 | Tom et al. | |
| 7,743,836 B2 | 6/2010 | Cook et al. | |
| 7,798,236 B2 | 9/2010 | McKeachnie et al. | |
| 8,459,347 B2 | 6/2013 | Stout | |
| 2002/0092654 A1* | 7/2002 | Coronado et al. | 166/369 |
| 2002/0096365 A1 | 7/2002 | Berscheidt et al. | |
| 2002/0108756 A1* | 8/2002 | Harrall et al. | 166/382 |
| 2002/0139541 A1 | 10/2002 | Sheffield et al. | |
| 2003/0019639 A1* | 1/2003 | Mackay | 166/384 |
| 2003/0226668 A1 | 12/2003 | Zimmerman et al. | |
| 2004/0159446 A1* | 8/2004 | Haugen et al. | 166/384 |
| 2004/0216868 A1 | 11/2004 | Owen, Sr. | |
| 2004/0251025 A1 | 12/2004 | Giroux et al. | |
| 2004/0261994 A1* | 12/2004 | Nguyen et al. | 166/278 |
| 2005/0098313 A1 | 5/2005 | Atkins et al. | |
| 2006/0186602 A1 | 8/2006 | Martin et al. | |
| 2007/0039161 A1* | 2/2007 | Garcia | 29/507 |
| 2007/0227745 A1 | 10/2007 | Roberts et al. | |
| 2008/0105438 A1 | 5/2008 | Jordan et al. | |
| 2008/0236842 A1 | 10/2008 | Bhavsar et al. | |
| 2009/0065216 A1 | 3/2009 | Frazier | |
| 2009/0126436 A1* | 5/2009 | Fly et al. | 72/58 |
| 2009/0139720 A1 | 6/2009 | Frazier | |
| 2009/0211770 A1 | 8/2009 | Nutley et al. | |
| 2010/0038076 A1* | 2/2010 | Spray et al. | 166/207 |
| 2010/0116495 A1* | 5/2010 | Spray | 166/276 |
| 2010/0276159 A1 | 11/2010 | Mailand et al. | |
| 2010/0326650 A1 | 12/2010 | Tran et al. | |
| 2011/0048743 A1 | 3/2011 | Stafford et al. | |
| 2011/0132143 A1 | 6/2011 | Xu et al. | |
| 2011/0132612 A1 | 6/2011 | Agrawal et al. | |
| 2011/0132619 A1 | 6/2011 | Agrawal et al. | |
| 2011/0132620 A1 | 6/2011 | Agrawal et al. | |
| 2011/0135953 A1* | 6/2011 | Xu et al. | 428/548 |
| 2011/0259610 A1 | 10/2011 | Shkurti et al. | |
| 2011/0314881 A1 | 12/2011 | Hatcher et al. | |
| 2012/0090839 A1* | 4/2012 | Rudic | 166/278 |
| 2012/0145378 A1 | 6/2012 | Frazier et al. | |
| 2012/0205872 A1 | 8/2012 | Reinhardt et al. | |
| 2012/0234546 A1 | 9/2012 | Xu et al. | |
| 2012/0234547 A1 | 9/2012 | O'Malley et al. | |
| 2013/0008671 A1 | 1/2013 | Booth et al. | |
| 2013/0048305 A1 | 2/2013 | Xu et al. | |
| 2013/0299185 A1* | 11/2013 | Xu et al. | 166/376 |
| 2013/0299192 A1 | 11/2013 | Xu et al. | |
| 2013/0300066 A1* | 11/2013 | Xu et al. | 277/336 |
| 2013/0319668 A1 | 12/2013 | Tschetter et al. | |
| 2014/0060834 A1* | 3/2014 | Quintero et al. | 166/292 |
| 2014/0262327 A1 | 9/2014 | Xu et al. | |
| 2014/0360728 A1* | 12/2014 | Tashiro et al. | 166/305.1 |

OTHER PUBLICATIONS

International Search Report for related PCT Application No. PCT/US2013/035258, dated Jul. 4, 2013, pp. 1-4.
International Search Report for related PCT Application No. PCT/US2013/035261, dated Jul. 10, 2013, pp. 1-4.
International Search Report for related PCT Application No. PCT/US2013/035262, dated Jul. 1, 2013, pp. 1-4.
International Search Report for related PCT Application No. PCT/US2013/068062, dated Feb. 12, 2014, pp. 1-3.
Simulia Realistic Simulation News, [online]; [retrieved on Jan. 10, 2013]; retrieved from the internet http://www.3ds.com/fileadmin/brands/SIMULIA/Customer_Stories/Baker_Hughes/Energy_BakerHughes_RSN_Feb11.pdf, "Baker Hughes Refines Expandable Tubular Technology with Abaqus and Isight," Jan./Feb. 2011, 2p.
Aviles et al, "Degradable Alternative to Risky Mill-Out Operations in Plug and Perf"; SPE-173695-MS; Society of Petroleum Engineers; SPE/ICOTA Coiled Tubing & Well Intervention Conference & Exhibition; March 24-25, 2015; 10 pages.
International Preliminary Report on Patentability; PCT/US2013/050475; Mailed February 26, 2015; 10 pages.
M.T. Triolo et al., "Resolving the Completion Engineer's Dilemma: Permanent or Retrievable Packer?"; Society of Petroleum Engineers, SPE Paper No. 76711; May 20, 2002; 16 pages.
Martin P. Coronado, "Development of an Internal Coiled Tubing Connector Utilizing Permanent Packer Technology"; Society of Petroleum Engineers, SPE Paper No. 46036; Apr. 15, 1998; 10 pages.
Notification of Transmittal of the International Search Report and the Written Opinion of the International Searching Authority, or the Declaration; PCT/US2014/010862; Apr. 21, 2014; 9 pages.
Notification of Transmittal of the International Search Report on Patentability and the Written Opinion of the International Searching Authority, or the Declaration; PCT/US2013/020046; Apr. 10, 2013, 7 pages.
Quik Drill Composite Frac Plug; Baker Hughes, Baker Oil Tools; Copyright 2002; 3 pages.

* cited by examiner

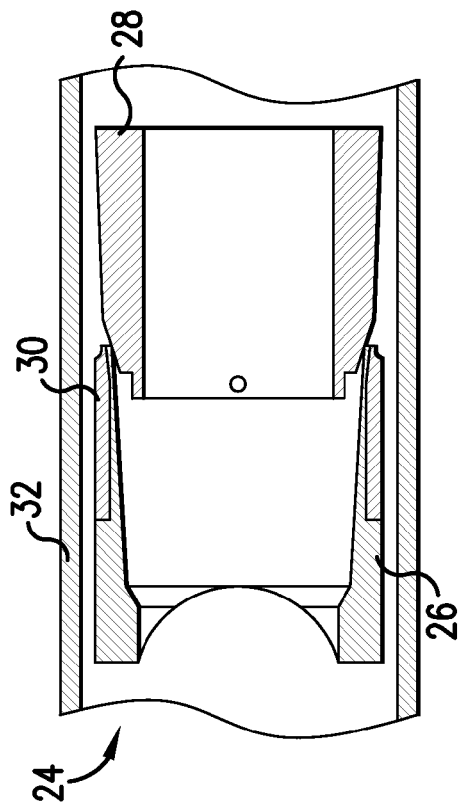
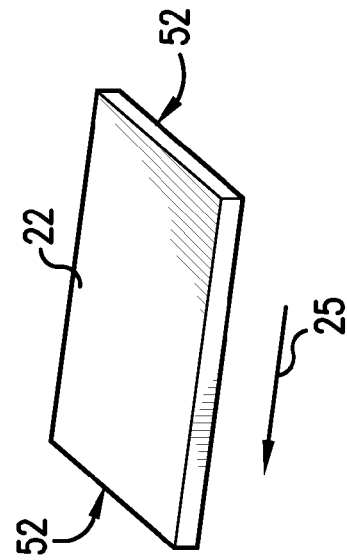
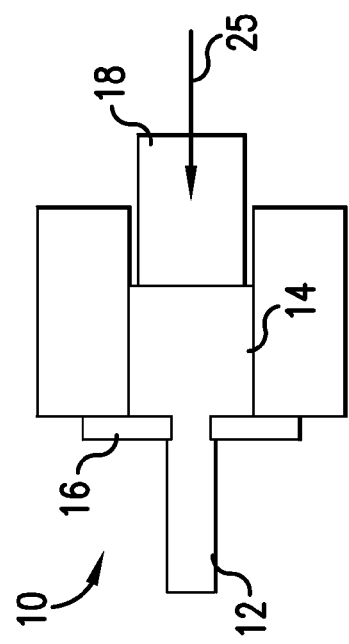
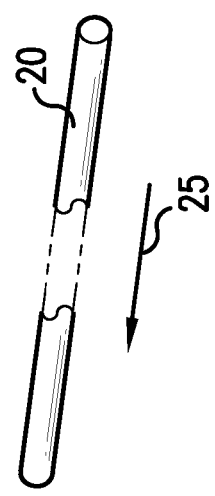

EXPANDABLE TUBULAR AND METHOD OF MAKING SAME

BACKGROUND

Radially expandable tubulars are used in a variety of applications in the downhole drilling and completions industry. Typically this involves running a wedge, swage, cone, or other expander device axially through the tubular until it is expanded to a final set of dimensions by the expander device. Expandable technology may be useful in or for various operations such as sealing, actuation, engagement, etc. For example, the radius of a tubular could be contracted to facilitate run-in then expanded, a tool or element such as a seal, slips, etc. could be engaged, actuated, or set between radially adjacent components, etc. The percentage that the tubular can be expanded and the performance of the tubular after expansion (e.g., sealing or actuation force maintained by the tubular after expansion) are determined by the inherent properties of the tubular and the material from which it is made, typically steel. The industry always well receives advances in expandable technology, particularly for enabling tubulars to be expanded by greater percentages and with improved properties after expansion.

SUMMARY

A radially expandable device, including a tubular body formed from an extruded member, the extruded member having an extrusion direction, the extruded member being configured after extrusion of the extruded member so that the extrusion direction aligns with a resulting circumference of the tubular body during formation of the tubular body from the extruded member, the extruded member being formed from a material operatively arranged to disintegrate upon exposure to a selected borehole fluid, the tubular body operatively arranged to be expanded from a first radial dimension to a second radial dimension.

A method of using a radially expandable device according to claim 1, including expanding the tubular body of the radially expandable device radially between the first and second radial dimensions.

BRIEF DESCRIPTION OF THE DRAWINGS

The following descriptions should not be considered limiting in any way. With reference to the accompanying drawings, like elements are numbered alike:

FIG. 1 is a schematic view of an apparatus for making an extrusion;

FIG. 2 is cross-sectional view of a system including an expandable device;

FIG. 3A is a schematic view of an extrusion arranged as a wire or strand for forming an expandable body according to one embodiment disclosed herein;

FIG. 4A is an extrusion arranged as a sheet for forming an expandable device according to another embodiment disclosed herein.

DETAILED DESCRIPTION

Figure 3B:
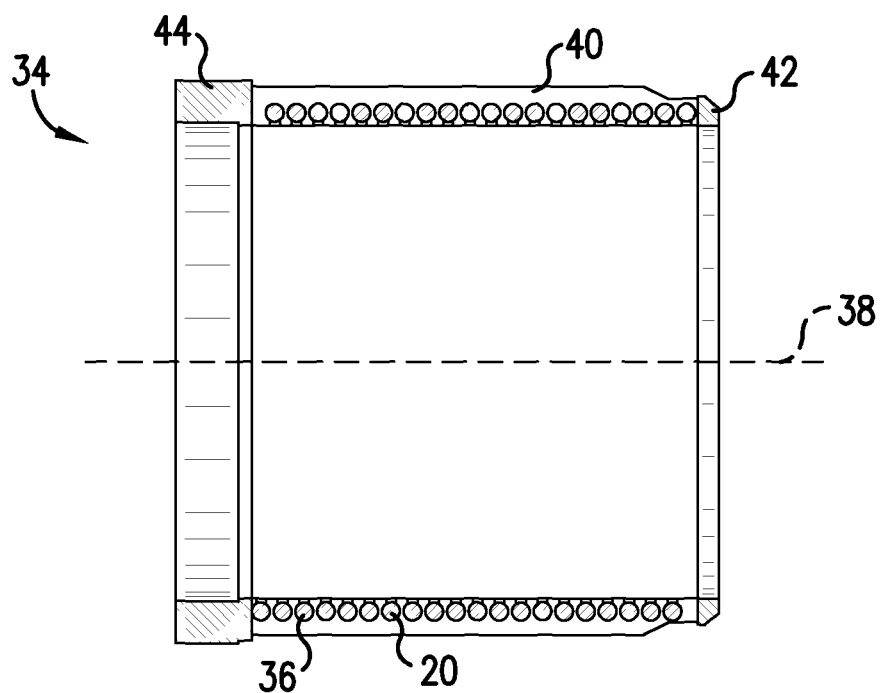
FIG. 3B is a device including an expandable body made from the extrusion of FIG. 3A.

A detailed description of one or more embodiments of the disclosed apparatus and method are presented herein by way of exemplification and not limitation with reference to the Figures.

Referring now to FIG. 1, an apparatus 10 for forming an extrusion 12 is shown schematically. The extrusion 12 is formed by forcing a billet 14 of material through a die 16, e.g., by a ram 18. In one embodiment, the ram 18 directly contacts the billet 14 and forces it through the die 16, while in another embodiment the billet 14 is disposed in a hydraulically sealed chamber at least partially by the ram 18 and the ram 18 compresses hydraulic fluid to force the billet 14 through the die 16. Those of ordinary skill in the art will of course recognize that these are just a few examples of an extrusion process, and that any number of extrusion apparatuses, systems, processes, and methods exist for extruding a member from a billet or other stock of material. FIGS. 3A and 4A show extrusions that could be made by the apparatus 10 and utilized in the embodiments discussed herein. Specifically, FIG. 3A shows a first extrusion 20, generally resembling a wire or strand of material, while FIG. 4A shows a second extrusion 22 generally resembling a sheet of material. The extrusions are associated with an extrusion direction, i.e., the direction a billet or other stock of material was forced through a die to form the extrusions, which is generally depicted by an arrow 25. As discussed in more detail below, these extrusions are utilized for forming a expandable devices according to various embodiments discussed herein. It is to be appreciated that various extrusions, including the extrusions 20 and 22 or ones similar thereto, could take other shapes and cross-sections, as desired. For example, instead of having a circular cross-section, the extrusion 20 could be polygonal.

A system 24 is shown in FIG. 2 to aid in describing various features and advantages of the embodiments discussed herein. The system 24 includes an expandable tubular body 26 that is expanded by an expander 28, e.g., a cone, wedge, swage, or other member. By expanding the tubular body 26 with the expander 28, an engagement member 30 disposed with the tubular body 26 can be engaged with an outer or radially adjacent structure such as a tubular 32. That is, the body 26 is plastically deformed from a first radial dimension, shown in FIG. 2, to a second radial dimension in which the engagement member 30 becomes engaged against the outer tubular 32 or other radially adjacent structure. The outer tubular 32 could be a borehole wall, casing, liner, or other completion or production tubular utilized in a downhole completion, e.g., for producing hydrocarbons or the like. In one embodiment the engagement member 30 is a seal for sealingly engaging the outer tubular 32 with the tubular body 26. Further examples of a seal device including an expandable tubular are given in U.S. patent application Ser. No. 13/466, 311 (Xu et al.), which is commonly owned with the instant application and included by reference herein in its entirety.

In another embodiment, the engagement member 30 comprises slips, teeth, protrusions, or other anchor members for securing, gripping, or other enabling the tubular body 26 to secure to or hang from the outer tubular 32. In another embodiment, the engagement member 30 is a fluid permeable foam or filtering material for screening sediment from a fluid of fluid. Those of ordinary skill will appreciate that other tools and devices could be utilized for enabling various manners of engagement between the expandable tubular body 26 and the outer tubular 32 or other radially adjacent structure.

According to the current invention, expandable bodies such as the body 26 in FIG. 2, are formed from extrusions, e.g., the extrusions 20 and 22. The extrusions 20 and 22 when made from selected materials and/or extruded under selected conditions will improve the performance of the expandable body, e.g., the percentage that the expandable body can expand, the resulting properties of the expandable body 26 after expansion, etc. Specifically, the extrusion direction (e.g., indicated by the arrow 25) of the extrusions (e.g., the extrusions 20 and 22) can be used to form expandable bodies (e.g., the body 26 or other examples illustrated in FIGS. 3B and 4B and discussed below) can be aligned with the direction of expansion of the expandable body and/or stresses therein, namely, circumferentially. That is, a tubular body during radial expansion will experience a significant level of circumferential or hoop stress, with the circumference of the body enlarging as the radius is expanded. By selecting materials that exhibit enhanced properties in the extrusion direction or enhanced properties as a result of the extrusion process, these enhanced properties of the materials in the extrusion direction can be utilized to improve expansion of the tubular. For example, the extrusions 20 and 22 can be formed from materials that exhibit significantly improved desired properties in the direction of extrusion. In one embodiment, discussed in more detail below, the material is a so-called controlled electrolytic metallic (CEM) material, which provides several unique features, including significantly increased strength and ductility in the extrusion direction due to the extrusion process, strain rate sensitivity, and disintegration rate tailorability.

Figure 4B:
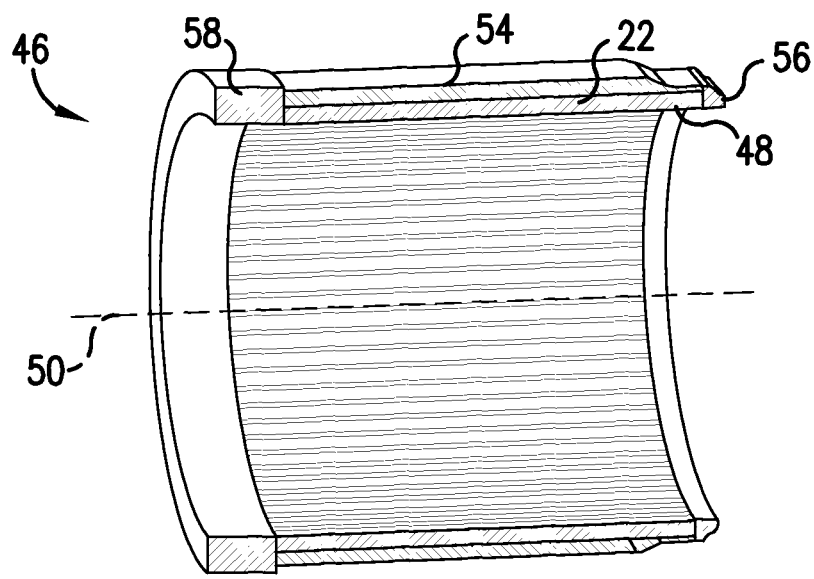
FIG. 4B is an expandable device including an expandable body formed from the extrusion of FIG. 4A.

Examples of expandable tubulars made from the extrusions 20 and are shown in FIGS. 3B and 4B, respectively. FIG. 3B shows a device 34 having an expandable tubular body 36 formed from the extrusion 20. Specifically, the extrusion 20, generally formed as a wire or strand, is wrapped, e.g., helically, about a central axis 38 to form the body 36. Alternatively, the extrusion 20 could be formed into separate rings that are axially stacked together to form the body 36. A seal element 40 is disposed about the body 36 for engagement with an outer member, structure, or tubular, e.g., the outer tubular 32. As noted above, the element 40 could be replaced with slips, filtering media, or some other feature, tool, or device for enabling a desired form of engagement between the body 36 and the radially adjacent structure. In one embodiment, the seal element 40 is a rubber or elastomeric element that is formed, molded, stretched, adhered, or otherwise positioned onto the body 36. A pair of end rings 42 and 44 could be included to maintain assembly of the device 34. The body 36, end rings 42 and 44, etc. may be secured together by welding or some other suitable manner. In one embodiment the end rings 42 and 44 are formed from dimensionally enlarged or thickened portions of the extrusion 20. In some embodiments the end rings 42 and 44 are intended to be expanded, while in other embodiments only the body 36 is intended to be expanded. If the ends rings 42 and/or 44 are to be expanded, they can be formed in a similar manner to that described above, with an extrusion direction aligned circumferentially with the rings 42 and/or 44 for improving the expanding characteristics thereof.

FIG. 4B shows a device 46 having a tubular body 48 formed from the sheet extrusion 22. Specifically, the body 48 is formed by bending, folding, or otherwise configuring the sheet extrusion 22 of FIG. 4A into a tubular form about an axis 50 by overlapping or securing together a pair of ends 52 that extend perpendicularly with respect to the extrusion direction, as indicated by the arrow 25. Similar to the device 34, the device 46 can be arranged with seal element 54 or filter media, slips, or some other tool, device, feature, etc. that enables a desired engagement between the device 46 and a radially adjacent structure or tubular. A pair of end rings 56 and 58 could be disposed with, affixed, welded or secured to, or otherwise formed with the body 48, similar to the rings 42 and 44 discussed above.

As noted above, CEM materials are highly strain sensitive and improve significantly in strength and ductility in the extrusion direction during extrusion. Furthermore, the CEM materials are selectively or tailorably disintegrable. The term disintegrable means dissolvable, consumable, decomposable, corrodible, degradable, or otherwise removable upon exposure to a selected downhole fluid such as water, brine, acid, oil, or combinations thereof. Thus, in addition to the above-noted benefits, the use of CEM materials further enables selective disintegration of the bodies 26, 36, and/or 48 if desired at some point after expansion, e.g., to remove the engagement of the body with a corresponding radially adjacent structure. Alternatively stated, the expandable bodies, when made of CEM materials, can be exposed to a selected fluid in order to begin disintegration of the bodies, which in turn will disengage the elements 30, 40, and/or 54. Furthermore, by altering the composition of the CEM material, the rate of disintegration can be set to take hours, days, weeks, months, etc. such that the expandable bodies can be in place for any desired amount of time before automatically disintegrating upon exposure to a selected fluid.

An example of CEM materials that are suitable for this purpose are commercially available from Baker Hughes Incorporated under the trade name IN-TALLIC®. A description of suitable materials can also be found in United States Patent Publication No. 2011/0135953 (Xu et al.), which Patent Publication is hereby incorporated by reference in its entirety. These lightweight, high-strength and selectably and controllably degradable materials include fully-dense, sintered powder compacts formed from coated powder materials that include various lightweight particle cores and core materials having various single layer and multilayer nanoscale coatings. These powder compacts are made from coated metallic powders that include various electrochemically-active (e.g., having relatively higher standard oxidation potentials) lightweight, high-strength particle cores and core materials, such as electrochemically active metals, that are dispersed within a cellular nanomatrix formed from the various nanoscale metallic coating layers of metallic coating materials, and are particularly useful in borehole applications. Suitable core materials include electrochemically active metals having a standard oxidation potential greater than or equal to that of Zn, including as Mg, Al, Mn or Zn or alloys or combinations thereof. For example, tertiary Mg—Al—X alloys may include, by weight, up to about 85% Mg, up to about 15% Al and up to about 5% X, where X is another material. The core material may also include a rare earth element such as Sc, Y, La, Ce, Pr, Nd or Er, or a combination of rare earth elements. In other embodiments, the materials could include other metals having a standard oxidation potential less than that of Zn. Also, suitable non-metallic materials include ceramics, glasses (e.g., hollow glass microspheres), carbon, or a combination thereof. In one embodiment, the material has a substantially uniform average thickness between dispersed particles of about 50 nm to about 5000 nm. In one embodiment, the coating layers are formed from Al, Ni, W or $Al_2O_3$, or combinations thereof. In one embodiment, the coating is a multi-layer coating, for example, comprising a first Al layer, an $Al_2O_3$ layer, and a second Al layer. In some embodiments, the coating may have a thickness of about 25 nm to about 2500 nm. These powder compacts provide a unique and advantageous combination of mechanical strength properties, such as compression and shear strength, low density and selectable and controllable corrosion properties, particularly rapid and controlled dissolution in various borehole fluids. The fluids may include any number of ionic fluids or highly polar fluids, such as those that contain various chlorides. Examples include fluids comprising potassium chloride (KCl), hydrochloric acid (HCl), calcium chloride ($CaCl_2$), calcium bromide ($CaBr_2$) or zinc bromide ($ZnBr_2$).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A radially expandable device for use in a borehole, comprising: a tubular body formed from an extruded member, the extruded member having an extrusion direction, the extruded member being configured after extrusion of the extruded member so that the extrusion direction aligns with a resulting circumference of the tubular body during formation of the tubular body from the extruded member, the extruded member being formed from a material operatively arranged to disintegrate upon exposure to a selected borehole fluid, the tubular body operatively arranged to be expanded from a first radial dimension to a second radial dimension.

2. The device of claim 1, wherein the extruded member is formed as a wire or strand.

3. The device of claim 2, wherein the extruded member is wrapped helically to form the tubular body.

4. The device of claim 2, wherein the extruded member is formed into a plurality of rings and the rings are stacked to form the tubular body.

5. The device of claim 1, wherein the extruded member is formed as a sheet.

6. The device of claim 5, wherein the sheet has opposite ends relative to the extrusion direction, and the ends are brought together about a central axis to form the tubular body.

7. The device of claim 1, wherein the tubular body is formed from a controlled electrolytic metallic material.

8. A radial expansion system comprising:
a radially expandable device according to claim 1;
an expander operatively engagable with the tubular body of the radially expandable device for deforming the tubular body from the first radial dimension to the second radial dimension.

9. The system of claim 8, further comprising an outer structure, the radially expandable device engaging with an outer structure when transitioned to the second radial dimension.

10. The system of claim 9, wherein the radially expandable device includes a seal element for enabling a sealed engagement between the radially expandable device and the outer structure.

11. The system of claim 10, wherein the outer structure is a borehole wall, a casing, a liner, a production tubular, a tubular string, or a combination including at least one of the foregoing.

12. A method of using a radially expandable device according to claim 1, comprising:
expanding the tubular body of the radially expandable device radially between the first and second radial dimensions with an expander engaged with the tubular body of the radially expandable device, thereby deforming the tubular body from the first radial dimension to the second radial dimension.

13. The method of claim 12, further comprising engaging an element of the radially expandable device with a radially adjacent structure when the radially expandable device is expanded to the second radial dimension.

14. The method of claim 13, wherein the element is a seal element, the method further comprising creating a seal between the radially adjacent structure and the engagement element due to the engaging.

15. The method of claim 12, further comprising disintegrating the tubular body by exposing the tubular body to the selected fluid.

* * * * *